United States Patent
Erben

(10) Patent No.: US 6,736,353 B1
(45) Date of Patent: May 18, 2004

(54) GROOVED PROFILE FOR DIVERTING LIQUID

(75) Inventor: Hannes Erben, Donauwoerth (DE)

(73) Assignee: Eurocopter Deutschland GmbH, Donauwoerth (DE)

(*) Notice: Subject to any disclaimer, the term of this patent is extended or adjusted under 35 U.S.C. 154(b) by 0 days.

(21) Appl. No.: 10/019,829

(22) PCT Filed: May 3, 2000

(86) PCT No.: PCT/DE00/01387

§ 371 (c)(1),
(2), (4) Date: Apr. 10, 2002

(87) PCT Pub. No.: WO00/68074

PCT Pub. Date: Nov. 16, 2000

(30) Foreign Application Priority Data

May 8, 1999 (DE) .......................................... 199 21 326

(51) Int. Cl.$^7$ .............................. B64C 1/14; B64C 1/00; E04D 15/00
(52) U.S. Cl. ................. 244/129.5; 244/119; 244/129.4; 52/97
(58) Field of Search ...................... 52/97, 204.2, 716.2, 52/716.5, 302.1; 244/119, 129.4, 129.5

(56) References Cited

U.S. PATENT DOCUMENTS

| 3,791,073 | A | * | 2/1974 | Baker | 49/249 |
| 4,375,876 | A | * | 3/1983 | Stewart | 244/129.5 |
| 5,337,977 | A | * | 8/1994 | Fleming et al. | 244/129.5 |
| 5,460,425 | A | * | 10/1995 | Stephens | 296/152 |
| 5,653,068 | A | * | 8/1997 | Moody et al. | 52/97 |
| 5,667,169 | A | * | 9/1997 | Erben et al. | 244/129.5 |
| 5,931,415 | A | * | 8/1999 | Lingard et al. | 244/129.5 |
| 6,168,114 | B1 | * | 1/2001 | Erben | 244/129.5 |
| 6,170,207 | B1 | * | 1/2001 | Saindon | 52/204.2 |
| 6,226,953 | B1 | * | 5/2001 | Uno et al. | 52/716.5 |
| 6,568,637 | B2 | * | 5/2003 | Bluem et al. | 244/129.5 |

FOREIGN PATENT DOCUMENTS

| DE | 3431912 | 11/1985 |
| DE | 4409326 | 10/1994 |
| EP | 0480747 | 4/1992 |

* cited by examiner

Primary Examiner—Brian E. Glessner
Assistant Examiner—Kevin McDermott
(74) Attorney, Agent, or Firm—W. F. Fasse; W. G. Fasse

(57) ABSTRACT

A channel profile extends above a door of an aircraft over the width of the door opening and is connected with the aircraft fuselage. When the door is open, the channel profile collects liquid (e.g. rain) flowing down from above the door, and diverts it next to the door opening. To reduce the air flow resistance arising during flight operation, with the door (2) in its closed position, the channel profile (3, 30) is retracted and enclosed behind the outer skin (6) or a flange of the door (2) in a dead space (11) between the upper edge of the door (2) and a frame (4) arranged above the door opening. When the door is opened, the channel profile extends into an outwardly protruding position on spring-loaded guides.

13 Claims, 3 Drawing Sheets

GROOVED PROFILE FOR DIVERTING LIQUID

FIELD OF THE INVENTION

The invention relates to a groove or channel profile for diversion of liquid, arranged above a door of an aircraft, whereby the channel profile extends over the width of the door opening and is connected with the fuselage of the aircraft, and the liquid collected by the channel profile is divertable next to the door opening.

BACKGROUND INFORMATION

In present-day aircraft it is typical to fixedly mount a channel profile on the fuselage above the door opening. This channel profile serves for the diversion of liquid that falls onto the fuselage above the channel profile and flows off downwardly. The channel profile thus extends over the width of the door opening, in order to catch or collect the flowing-off or draining liquid and to divert it next to the door opening. This diversion of the liquid above the door opening always becomes necessary whenever the parked aircraft is exposed to an atmospheric rain, or if liquid chemicals, for example for the prevention of ice formation, that are sprayed onto the aircraft, are to be diverted. The channel profile prevents the flowing-off or draining liquid from entering into the door opening or, falling on persons located in the door opening. That is especially known in airplanes.

While this profile is thin, it is very long because it must reach at least over the entire width of the door. Thereby, the channel profile represents one of the substantial interferences or disruptions of the otherwise aerodynamically smooth fuselage during flight operation.

The channel profile is arranged essentially in the direction of the airflow that flows around the fuselage. Due to the height of the channel profile, which protrudes outwardly beyond the boundary layer at least in the forward fuselage area, and due to the variable incident relative wind conditions during cruise flight, it is only approximately successful, to achieve the direction of the airflow. The channel profile represents an aerodynamic resistance. As a result, an interference of the airflow along the fuselage, and therewith an additional flow resistance, is not avoidable.

SUMMARY OF THE INVENTION

The object of the invention is to improve a channel profile in such a manner so that the arising flow resistance during flight operation of an aircraft is further reducible.

The object is achieved in that, in the closed position of the door, the channel profile is arranged behind the outer skin of the door in a dead space between the upper edge of the door and a frame that is guided or extends above the door opening. Thus, during flight operation the advantage is achieved, that the previous flow resistance of the channel profile in connection with aircraft is fundamentally removed or done away with. The invention is utilizable in connection with all types of aircraft, especially airplanes and rotary wing aircraft.

According to one embodiment of tale invention, the channel profile is secured on a frame blind member and is movable between a latching position that lies under the contour of the outer wall and that is reached with the closed position of the door, and an unlatching position that is reachable at the open position of the door. The channel profile is arrestable or blockable in the latching position and in the unlatching position. It is thus achieved, that the channel profile is functional upon opening the door, namely already upon lifting the door and still before the pivoting of the door, whereby liquid diverted above the door opening is catchable or collectible and divertable next to the door opening. Advantageously, the liquid diverted by the channel profile can be guided onto a frame-side or frame-mounted sealing profile member, and from there can be diverted onto the outer wall lying below the door opening.

The channel profile is arrestable or blockable by the outer skin, against the force of a spring means, under the outer wall of the fuselage. The spring means is situated in engagement with a guide means, which guides the channel profile.

BRIEF DESCRIPTION OF THE DRAWINGS

An example embodiment of the invention is illustrated in the drawing, and described in greater detail in the following. It is shown by.

DETAILED DESCRIPTION OF A PREFERRED EXAMPLE EMBODIMENT OF THE INVENTION

Figure 1:
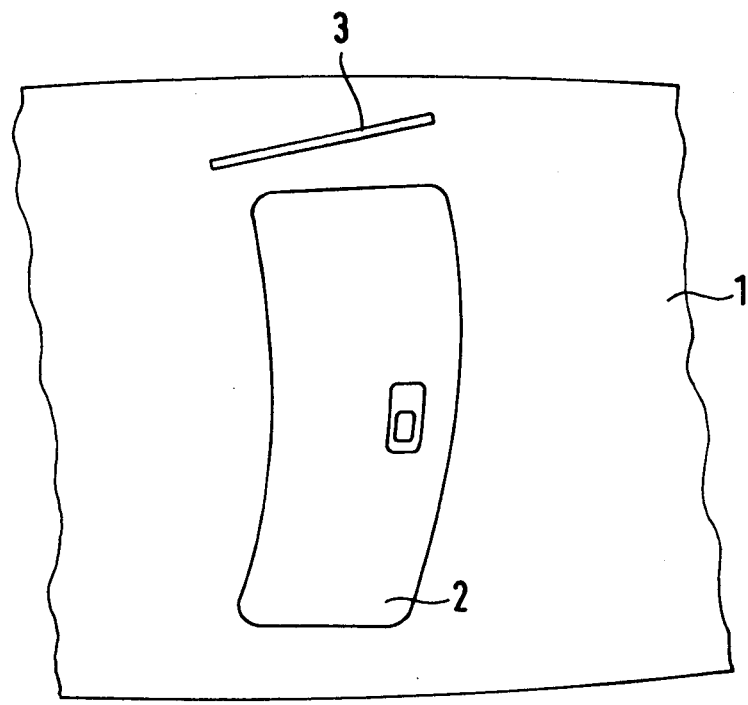
FIG. 1 partial view of the outer wall of an aircraft fuselage with closed door and a rigid channel profile as prior art.

FIG. 1 shows, according to the prior art, the portion of a view of the outer wall 1 of an aircraft fuselage with closed door 2 and a rigid channel profile 3 above the door. The channel profile 3 represents an additional flow resistance. Such interferences of the airflow along the fuselage generate a vortex formation and prevent an undisturbed boundary layer. They are thus a not inconsiderable noise source.

The invention will be described in connection with the following FIGS. 2 to 4.

Figure 2:
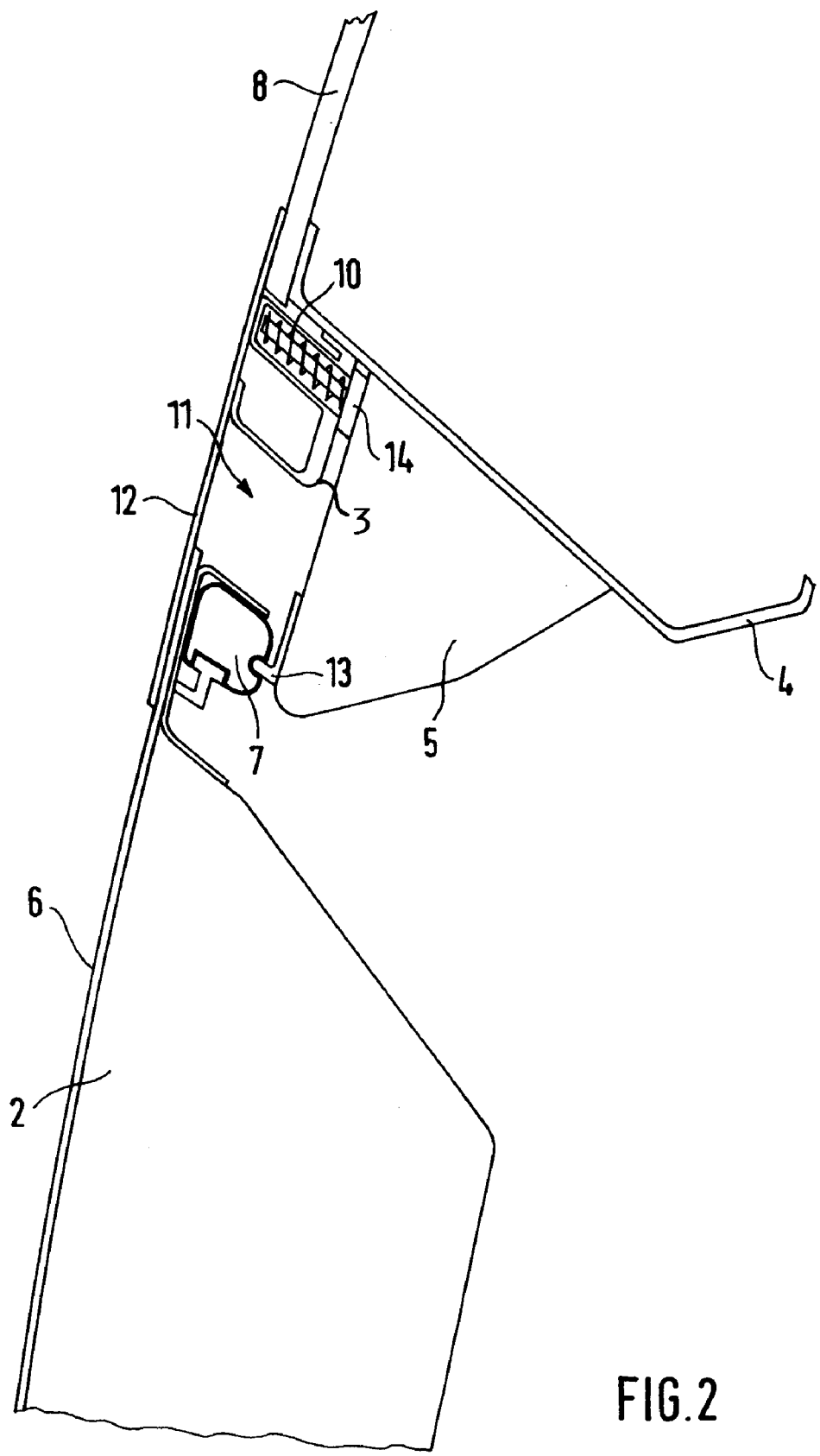
FIG. 2 side view of the closed position of the door with latching position of the channel profile.

FIG. 2 shows the closed position of the door 2. The outer skin 6 of the door 2 essentially forms a closed contour with the outer wall 8 of the fuselage. It is recognizable, that the door 2 has a blind flange 12 mounted thereon, there where the outer skin 6 of the door ends. This blind flange 12 is secured onto the outer skin 6 of the door 2. As a matter of fabrication technology, this blind flange 12 can also be an extension of the outer skin 6. A door-side or door-mounted seal 7 is arranged on the inner side of the outer skin 6. The door-mounted seal 7 surrounds the door 2 in the circumferential or perimeter direction. The seal 7 contacts and lies on a frame-side or frame-mounted seal profile member 13, which is mounted on a frame blind member 5. The frame blind member 5 is secured on the door frame 4. Door-mounted seal 7 and frame-mounted seal profile member 13 form a hermetic closure of the fuselage interior space relative to the outer atmosphere. The channel profile is arranged in a dead space 11, which is provided between upper frame blind member 5, door-mounted seal 7, and door blind flange 12. The channel profile 3 is held in latching position in this dead space 11.

The channel profile 3 is situated in engagement with a guide means 14 mounted on the frame blind member 5. A spring means 10 braces itself relative to the channel profile 3 on the guide means 14. The channel profile 3 is arrested or blocked in latching position, against the force of the spring means 10, by the door blind flange 12 acting as a contact stop. The channel profile 3 is advantageously no longer arranged on the outer wall 8 of the fuselage, so that the disadvantages of the prior art are obviated. The latching position of the channel profile 3 is basically reached or achieved in the closed position of the door 2 (closed condition). The channel profile collects the liquid with an essentially U-shaped profile.

Figure 3:
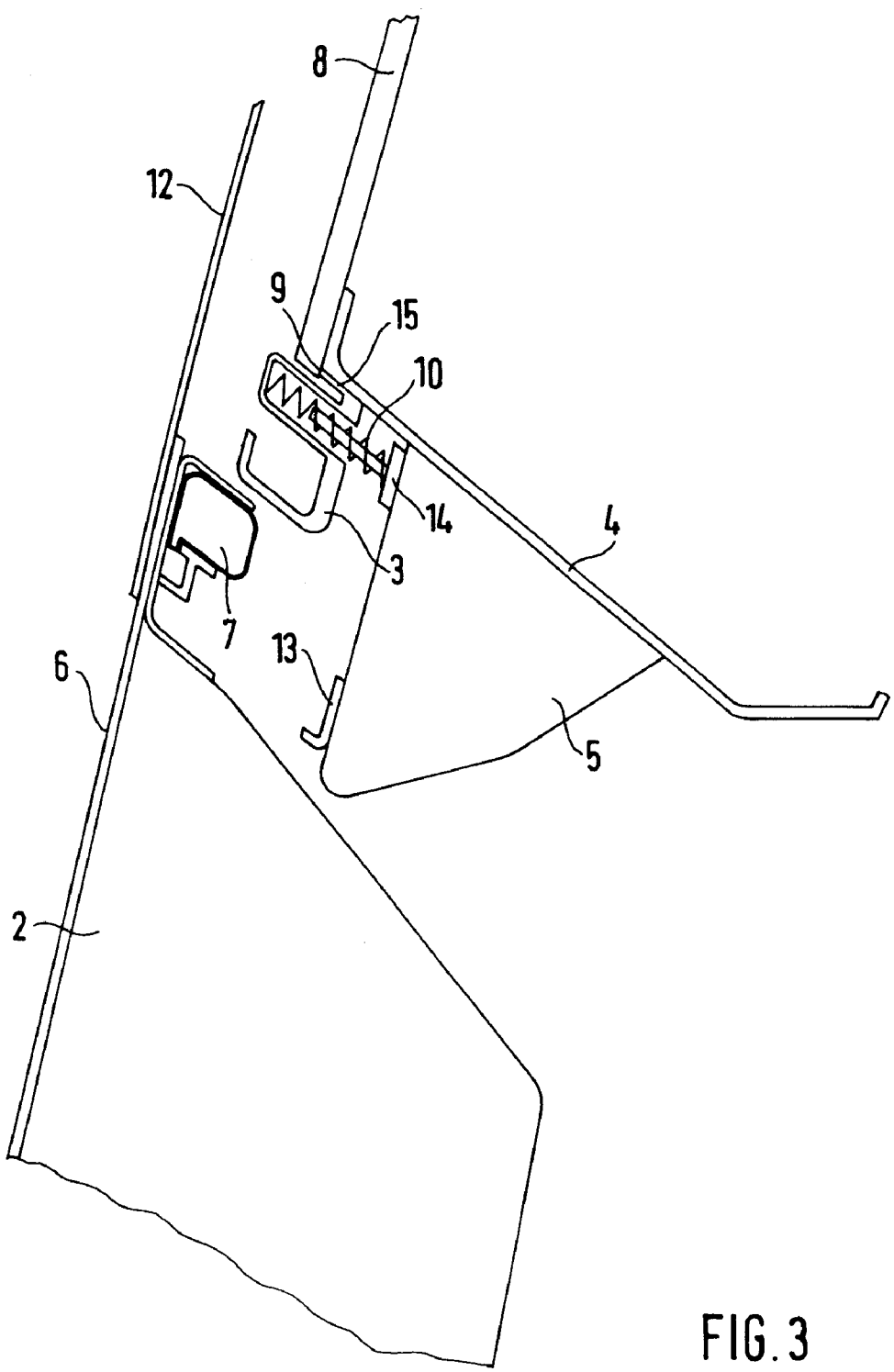
FIG. 3 open position of the door with unlatching position of the channel profile.

FIG. 3 shows the channel profile 3 in the open position of the door 2. The open position of the door 2 includes the lifting and/or pivoting of the door 2. Since the unlatching position of the channel profile 3 reached in FIG. 3 is already achieved in the motion step of the lifting of the door 2, and this step already belongs to the condition of the opening of the door, the following text will simply refer to the open position of the door for reasons of simplification.

Already in connection with the first step of the open position, the lifting of the door, the spring means 10, due to the stored kinetic energy, moves the channel profile 3 along the path of the guide means 14 into the unlatching position. Already at this time, liquid draining or flowing off from the outer wall 8 of the fuselage will be collected and diverted by the channel profile 3. The diversion of the liquid can advantageously be carried out onto the already existing frame-mounted seal-profile member 13. From the seal profile member 13, the further guiding can be carried out next to the door opening onto the outer lower fuselage wall.

The further step of the pivoting of the door during the opening process leaves the already achieved unlatching position of the channel profile 3 undisturbed. In the unlatching position, the channel profile 3 can be arrested or blocked somewhat outside of the contour of the outer wall 8. An arresting or blocking of the channel profile 3 is achieved by the channel nose 15 contacting onto a stop 9 lying on the inside of the outer wall 8.

Figure 4:
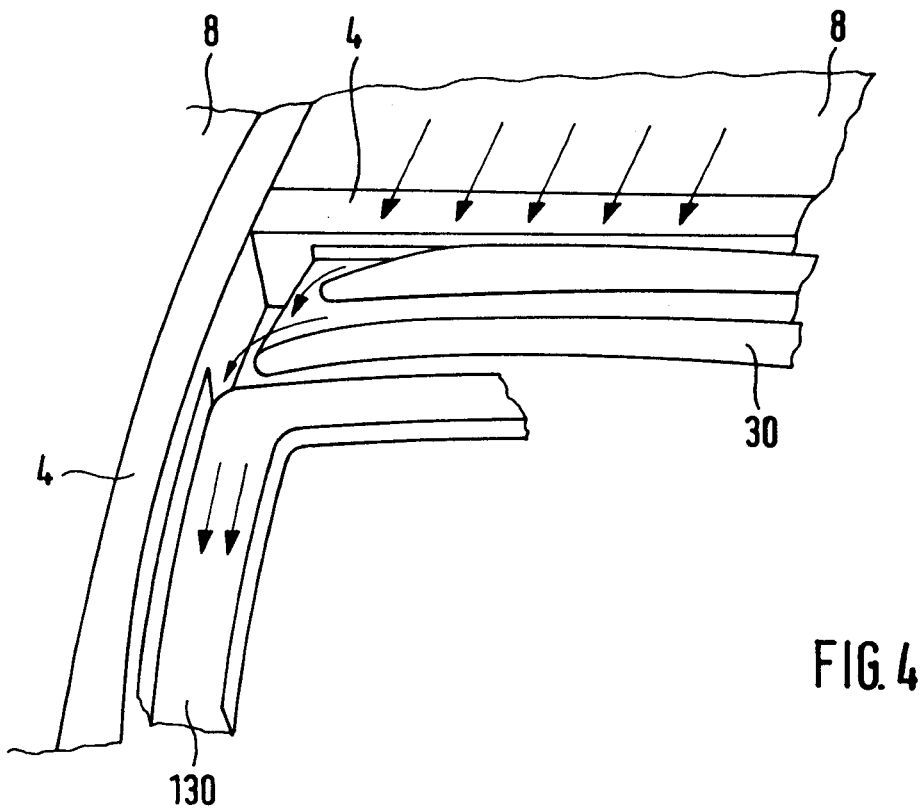
FIG. 4 schematic partial arrangement of the channel profile in cooperation with the frame-side or frame-mounted sealing profile member.

FIG. 4 partially and schematically shows how liquid collected in the channel profile 30 can flow or drain onto the frame-mounted. seal profile member 130. The channel profile 30 is disposed in unlatching position. The door 2 is not shown. At the bottom end of the frame-mounted seal profile member 130 (not shown), the liquid is once again guided onto the outer wall 8 of the fuselage. In a further advantageous embodiment, the spring means 10 can be actively controlled by a drive unit (not shown). The drive unit could control the movement of the spring means electrically, pneumatically or hydraulically. The movement is only necessary for reaching the unlatching position. The return movement of the channel profile 3 into the latching position could be achieved by the door blind flange 12 that is to be brought into contact with the channel profile.

A further embodiment provides that the channel profile 30 is utilized simultaneously for improving the sealing of the door. In such a case, the channel profile 30 is preferably fabricated of an elastic material.

The channel Profile 30 could also consist of several parts, which may possibly be unfoldable to the right and to the left, in order to improve the lateral sealing.

What is claimed:

1. An aircraft structure including an aircraft fuselage having an outer wall with a door opening therein, a frame secured to the fuselage adjacent to the door opening, a frame blind member secured to the frame and bounding the door opening, a door that is mounted movably relative to the door opening so as to be movable between an open position and a closed position relative to the door opening, a door blind flange protruding from an edge of the door, a seal provided between the door and the frame blind member, and a U-shaped channel profile that extends over a width of the door opening and that is adapted to collect liquid and divert the liquid next to the door opening, wherein the door, in the closed position, forms a dead space between the frame with the frame blind member, the seal and the door blind flange, while lying in a sealing manner against the frame blind member with the seal therebetween, characterized in that the channel profile (3, 30) is secured in the dead space (11) on the frame blind member (5) and is movable between a latching position lying under a contour of the outer wall (8) of the fuselage in the closed position of the door (2) and an unlatching position lying above the contour of the outer wall (8) in the open position of the door (2).

2. The aircraft structure according to claim 1, characterized in that the channel profile is arrestable or blockable in the latching position and the unlatching position.

3. The aircraft structure according to claim 1, further comprising a biasing spring arranged in the dead space, characterized in that the channel profile (3, 30) is arrestable or blockable by the door blind flange against the force of the biasing spring, under the outer wall (8) of the fuselage.

4. An aircraft door assembly arranged in combination with an aircraft fuselage including a fuselage outer skin and a frame arrangement bounding a door opening in said fuselage outer skin, comprising:

a door including a door body and a door flange protruding upwardly from a top edge of said door body, wherein said door is movably mounted to said fuselage to be movable between a closed door position and, an open door position relative to said door opening; and a channel-sectional profile member that is connected to said frame arrangement at a top of said door opening, wherein said channel-sectional profile member is movable between, a retracted position in which said channel-sectional profile member is received in a dead space between said door flange and said frame arrangement when said door is in said door closed position and an extended position in which at least a portion of said channel-sectional profile member protrudes outwardly away from said frame arrangement beyond an outer surface contour of said fuselage outer skin when said door is in said door open position, and wherein said channel-sectional profile member in said extended position is adapted to catch liquid running from said fuselage outer skin above said door opening and to divert the liquid to at least one side of said door opening.

5. The aircraft door assembly according to claim 4, further comprising a seal arrangement that is arranged between said door flange and said frame arrangement and that forms an air-tight seal between said door flange and said frame arrangement when said door is in said closed door position, and wherein said channel-sectional profile member in said retracted position is located in said dead space above said seal arrangement.

6. The aircraft door assembly according to claim 4, wherein said channel-sectional profile member is located above a top boundary of said door opening bounded by said frame arrangement, and extends along an entire width of said door opening.

7. The aircraft door assembly according to claim 4, wherein said channel-sectional profile member is arrestable in said retracted position and in said extended position.

8. The aircraft door assembly according to claim 4, further comprising a biasing spring that is interposed between said channel-sectional profile member and said frame arrangement and that exerts a biasing force which biases said channel-sectional profile member to move from said retracted position to said extended position.

9. The aircraft door assembly according to claim 8, wherein said door flange cooperates with said channel-sectional profile member to push said channel-sectional profile member from said extended position to said retracted position against said biasing force when said door is moved from said open door position to said closed door position.

10. The aircraft door assembly according to claim 4, wherein said channel-sectional profile member consists of an elastic material.

11. The aircraft door assembly according to claim 4, wherein said door flange overlaps flushly onto said fuselage outer skin above said door opening so as to close said dead space when said door is in said closed door position.

12. The aircraft door assembly according to claim 4, wherein said door body includes a door outer skin forming an outer surface thereof, and wherein said door flange is connected to, overlaps flushly onto and extends from said door outer skin at said top edge of said door body.

13. The aircraft door assembly according to claim 4, wherein said channel-sectional profile member comprises a U-shaped cross-sectional channel.

* * * * *

UNITED STATES PATENT AND TRADEMARK OFFICE
CERTIFICATE OF CORRECTION

PATENT NO. : 6,736,353 B1
DATED : May 18, 2004
INVENTOR(S) : Erben

It is certified that error appears in the above-identified patent and that said Letters Patent is hereby corrected as shown below:

Title page,
Item [75], Inventors, replace "Donauwoerth" by -- Hamburg --

Column 1,
Line 28, after "or", delete ",";
Line 61, after "of", replace "tale" by -- the --;

Column 3,
Line 40, after "frame-mounted", delete ".";
Line 57, after "channel", replace "Profile" by -- profile --;

Column 4,
Line 36, after "between", delete ",".

Signed and Sealed this

Tenth Day of August, 2004

JON W. DUDAS
*Acting Director of the United States Patent and Trademark Office*